Jan. 30, 1934.  S. WIDMER ET AL  1,945,472
ELECTRIC CURRENT RECTIFYING SYSTEM
Filed Feb. 5, 1932  5 Sheets-Sheet 4

Inventors
S. Widmer
H. Keller
M. Hürlimann
by
Attorney

UNITED STATES PATENT OFFICE 1,945,472

ELECTRIC CURRENT RECTIFYING SYSTEM

Stefan Widmer, Hans Keller, and Max Hürlimann, Baden, Switzerland, assignors to Aktiengesellschaft Brown Boveri & Cie., Baden, Switzerland, a joint-stock company of Switzerland Application February 5, 1932, Serial No. 591,012, and in Germany February 2, 1931

5 Claims. (Cl. 175—363)

This invention relates to improvements in electric current rectifying systems and particularly to such systems in which means are provided to facilitate picking up of the arc by the main anodes of an electric current rectifier of the metallic vapor arcing type and in which such means are combined with other means to aid in protecting the system against backfires or short circuits therein.

Electric current rectifiers of the metallic vapor arcing type are subject to backfires in which the current flows from the cathode to an anode i. e., in the reverse direction from that usual in normal operation and are also subject to short circuits in which the current flows from one anode to another. Such backfires and short circuits are disturbing to the direct current system supplied by the rectifier and may prove very injurious to the rectifier itself unless the backfiring or short circuit current is interrupted. Short circuits in the direct current circuit supplied by the rectifier may also prove damaging to the rectifier structure itself unless such short circuits are interrupted immediately upon the occurrence thereof. The use of control electrodes associated with the anodes, for the purpose of preventing such backfires and short circuits, is well known in which a potential which is negative relative to the cathode is applied to the control electrodes upon the occurrence of a disturbance in the rectifier or in the rectifying system. Such negative bias may be applied to the control electrodes by the use of relays which may be connected either with the connections of the anodes with the anode supply transformer or with the output circuit of the rectifier. The potential applied to the control electrodes may be either a direct current potential or an alternating current potential. If an alternating current potential is used such potential must, however, be displaced in phase sufficiently to force the control electrodes to remain negative as long as a negative potential is present on the associated anodes.

Regulation of the potential of the direct current output of the rectifier may also be controlled by delaying the time in the cycle of the alternating current potential supplied to the anodes at which the arc will be picked up by the anodes. Such regulation is obtained by maintaining a negative potential on the control electrodes until picking up of the arc by the associated anodes is desired and then applying a positive potential to the control electrodes. A great many means for obtaining such regulation are known to the art and need not, therefore, be here further described.

The use of control electrodes as arc maintaining or excitation anodes to maintain the arc within the rectifier has also been proposed to avoid the use of separate anodes for such purpose which do not have any function other than keeping the arc alive during the periods when such arc might accidentally become extinguished.

Dependent upon the construction of the control electrodes, it may become necessary, under some conditions, to impress a positive potential on the control electrodes to cause picking up of the arc by the anodes as a result of the positive potential on the control electrodes. The control electrodes must then be charged with positive potential at the moment the associated anodes are to pick up the arc.

All of the arrangements above indicated for controlling a rectifier by controlling the potential impressed on the control electrodes associated with the anodes have previously been separately applied. Thus separate systems were heretofore required to provide for interruption of backfires or short circuit, to facilitate picking up of the arc by the anodes, to regulate the direct current potential of the rectifier and to employ the control electrodes also as excitation anodes.

It is, therefore, among the objects of the present invention to provide a control electrode control system for electric current rectifiers of the metallic vapor arcing type which system combines several of the functions of the control electrode control systems previously employed for a single purpose.

Another object of the invention is to provide a control electrode control system for electric current rectifiers of the metallic vapor arcing type which system serves the dual purpose of facilitating picking up of the arc by the anodes and of interrupting a backfire or short circuit in the direct current circuits supplied by the rectifier.

Another object of the invention is to provide a control electrode control system for electric current rectifiers of the metallic vapor arcing type which system serves the dual purpose of facilitating picking up of the arc by the anodes and of interrupting a backfire or short circuit in the direct current circuits supplied by the rectifier, by the impression of a potential on the grids which is negative relative to the cathode potential.

Another object of the invention is to provide a control electrode control system for electric current rectifiers of the metallic vapor arcing type which system serves the dual purpose of facilitating picking up the arc by the anodes and of interrupting a backfire or short circuit in the direct current system supplied by the rectifier, as well as the purpose of regulating the potential of the direct current output of the rectifier by regulating the moment at which an anode picks up the arc as the result of the impression of a combined direct current and alternating current potential on the control electrodes.

Objects and advantages other than those above set forth will be apparent from the following description when read in connection with the accompanying drawings, in which:

Fig. 1 diagrammatically illustrates an electric current rectifying system employing a rectifier of the metallic vapor arcing type controlled by control electrodes and illustrates means for charging the control electrodes with potentials to facilitate picking up of the arc by the anodes of the rectifier and to secure interruption of the flow of current in the rectifier upon the occurrence of backfires or short circuits in the system.

Fig. 2 graphically illustrates the potential relations prevailing on the control electrodes during the operation of an electric current rectifying system such as illustrated in Fig. 1.

Fig. 3 diagrammatically illustrates an electric current rectifying system in which a combined alternating current and direct current potential is impressed on the control electrodes of an electric current rectifier of the metallic vapor type in which the direct current potential is supplied from the cathode bus bar of the rectifier.

Figure 7:
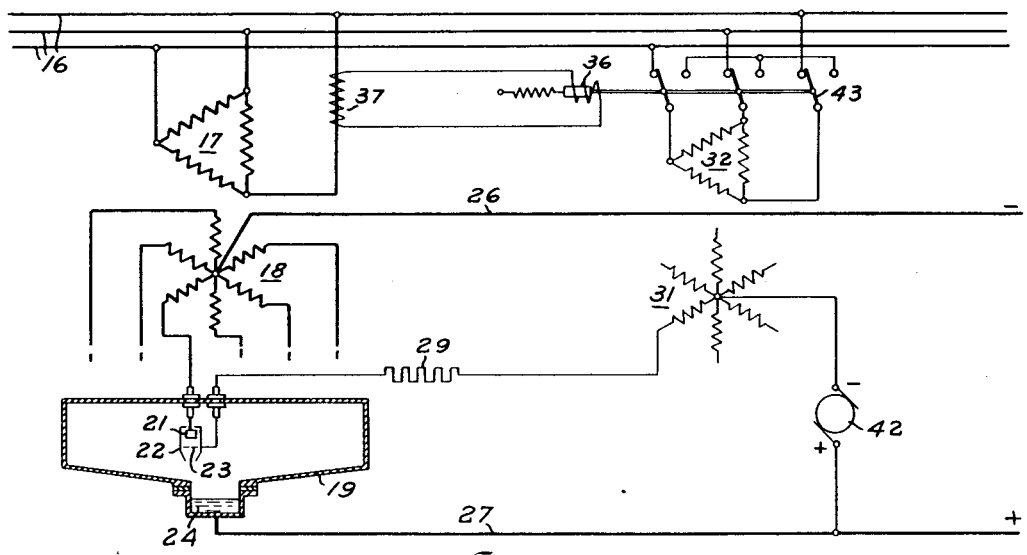

Fig. 7 diagrammatically illustrates an electric current rectifying system in which means are provided for disconnecting the source of alternating current potential applied to the control electrodes of an electric current rectifier of the metallic vapor arcing type from such control electrodes upon the occurrence of a disturbance in the system.

Figure 8:
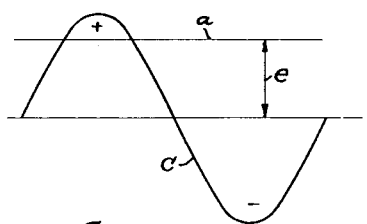

Fig. 8 is a graphic diagram illustrating the potential relations of the control electrodes having a combined alternating current and direct current potential impressed thereon by the means shown in Fig. 7.

Figure 9:
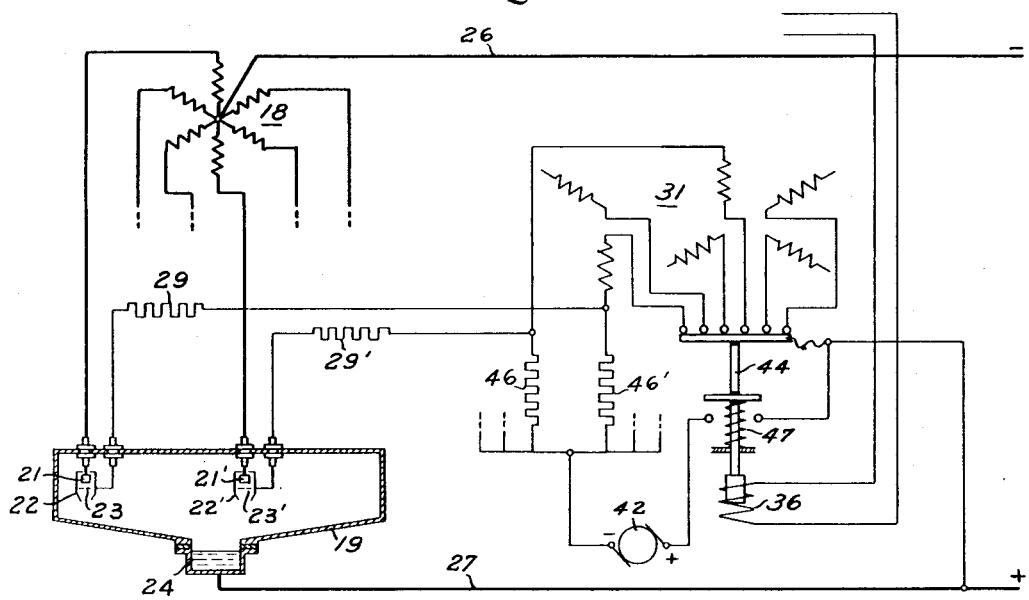

Fig. 9 diagrammatically illustrates an electric current rectifying system in which means are provided for disconnecting the source of alternating current to the control electrodes of an electric current rectifier of the metallic vapor arcing type from such control electrodes and for connecting a source of direct current to such control electrodes.

Figure 10:
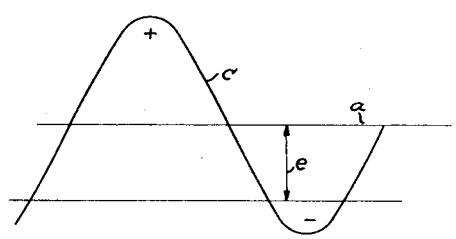

Fig. 10 graphically illustrates the potential relations prevailing on the control electrodes upon the operation of a system such as illustrated in Fig. 8.

Figure 11:
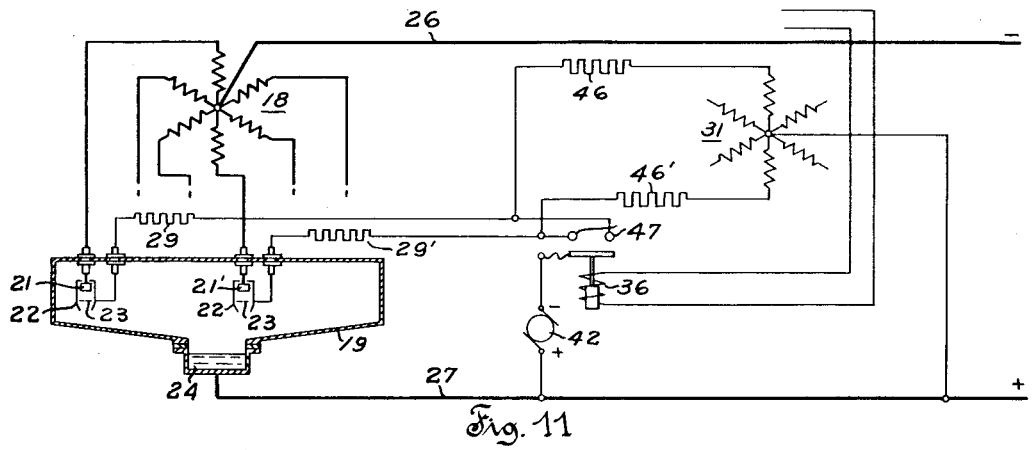

Fig. 11 diagrammatically illustrates an electric current rectifying system employing an electric current rectifier of the metallic vapor arcing type having control electrodes in which means are provided for superposing a direct current potential upon an alternating current potential applied to the control electrodes upon the occurrence of a disturbance in the system.

Figure 12:
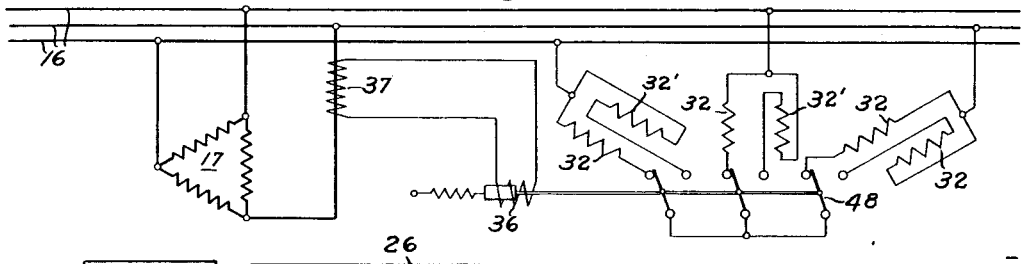
Figure 12:
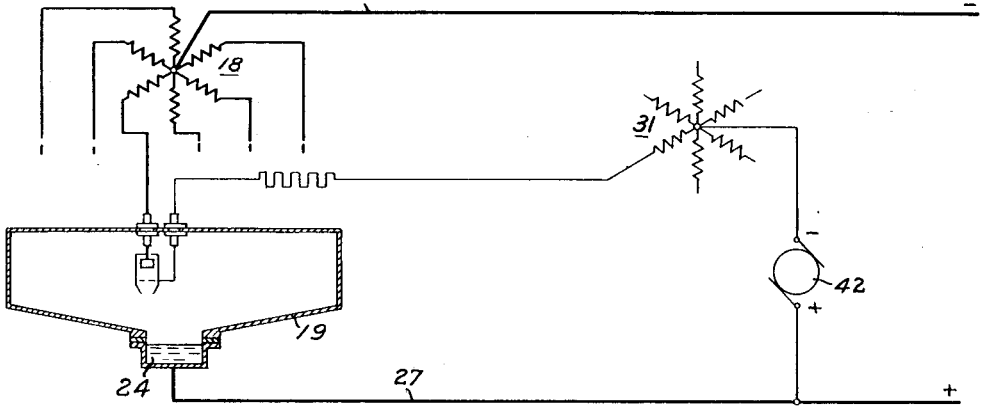

Fig. 12 graphically illustrates an electric current rectifying system of the character above indicated in which means are provided for changing the phase of an alternating potential applied to the control electrodes of an electric current rectifier upon the occurrence of a disturbance in the system.

Figure 13:
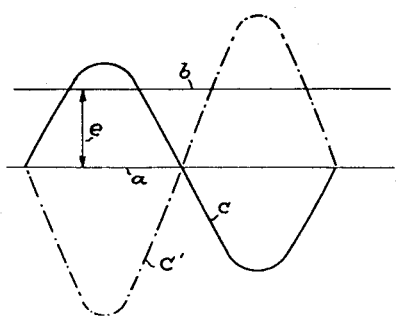

Fig. 13 graphically illustrates the potential relations prevailing at the control electrodes upon the operation of the system illustrated in Fig. 11.

Figure 14:
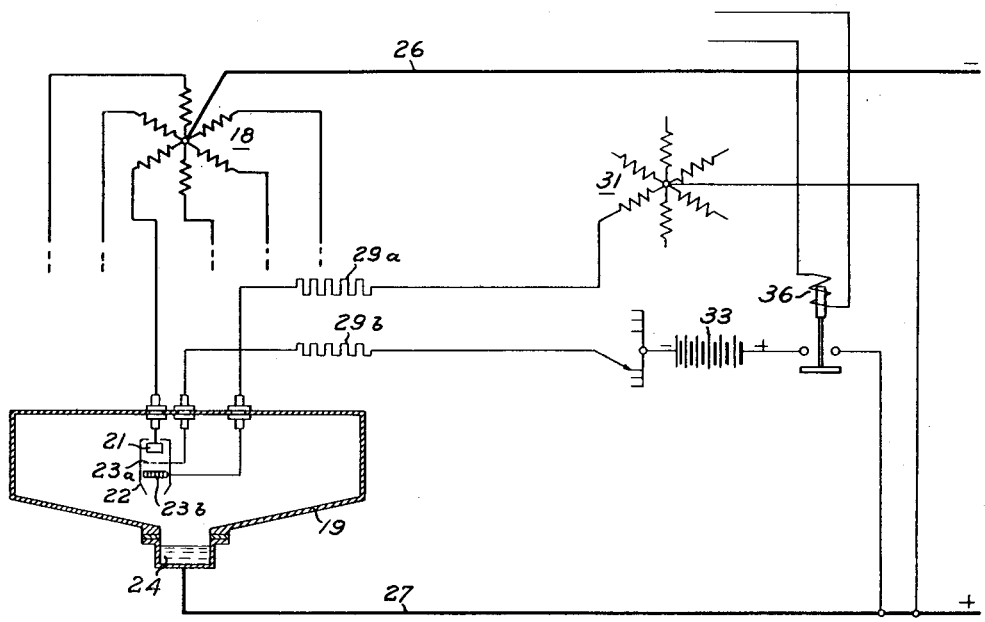

Fig. 14 diagrammatically illustrates an electric current rectifying system employing an electric current rectifier of the metallic vapor arcing type in which a plurality of control electrodes are associated with each of the anodes and in which each of the control electrodes has either an alternating or a direct current potential impressed thereon for the purpose of either facilitating the picking up of the arc by the anodes or for interrupting such arc upon the occurrence of a backfire or short circuit within the system.

Referring now more particularly to the drawings by characters of reference, the reference numeral 16 designates an alternating current line for supplying current to the primary winding 17 of a transformer of which the secondary winding 18 is connected with the anodes of an electric current rectifier of the metallic vapor arcing type comprising a chamber 19, a plurality of anodes 21, an arc guide 22 arranged to partially enclose each of the anodes, a control electrode 23 arranged within each of the arc guides and a pool 24 of vaporizable material, such as mercury, forming a cathode. Each of the several phase windings of the transformer secondary winding 18 is connected with and supplies one anode of the rectifier as is usual in systems of the character described. The circuit which is supplied from the rectifier with direct current is formed by a conductor 26 connected with the neutral point of the transformer secondary winding 18 and a conductor 27 connected with the cathode 24 of the rectifier, the conductors 26 and 27 forming the negative and positive bus bars respectively of a direct current supply line supplying current to direct current consuming devices indicated at 28.

Each of the control electrodes 23 is connected through a current limiting resistance 29 with one of the phase windings of the secondary winding 31 of a transformer having the primary winding 32 thereof connected with the alternating current supply line 16 or another suitable source of alternating current potential. The neutral point of the transformer secondary winding 31 may be connected directly or through a battery 33 or other suitable source of direct potential with the positive bus bar 27 by means of the contacts 34 of a current operated relay 36. The coil of the relay 36 is arranged to be energized from a current transformer 37 connected with the primary windings of the anode supply transformer 17, 18.

During normal operation of the rectifier, i. e., when the arc flows from an anode to the cathode, the current supplied by the transformer 37 is not sufficient to actuate the armature of relay 36 and the contacts 34 then connect the neutral point of the control electrode supply transformer 31, 32 directly with the cathode 24 of the rectifier. In case of a backfire or short circuit in the rectifier or in the direct current system, in which case an overload is imposed on the supply transformer primary winding 31, the transformer 37 will energize the coil of relay 36 to an extent such as to actuate the contacts 34 to connect a source of direct current such as the battery 33 with the neutral point of the secondary winding 31 of the control electrode supply transformer. The negative pole of the battery 33 is connected with the neutral point of the secondary winding 31 and the positive pole of the battery is arranged to be connected with the cathode 24. The direct current potential impressed upon the phase windings of the secondary winding 31 is preferably greater than the maximum of any of the phase voltages of the secondary winding 31. The control electrodes are thus supplied with a potential which is negative relative to the cathode potential and any arc flowing from the cathode to the anodes will thereby be prevented from reattaching on the anodes after interruption thereof. Due to the phase relation of the phase windings of the secondary winding 31 relative to the phase windings of secondary winding 18, each of the control electrodes is positively charged at the time the associated anode is to pick up the arc thus facilitating operation of the rectifier.

Figure 1:
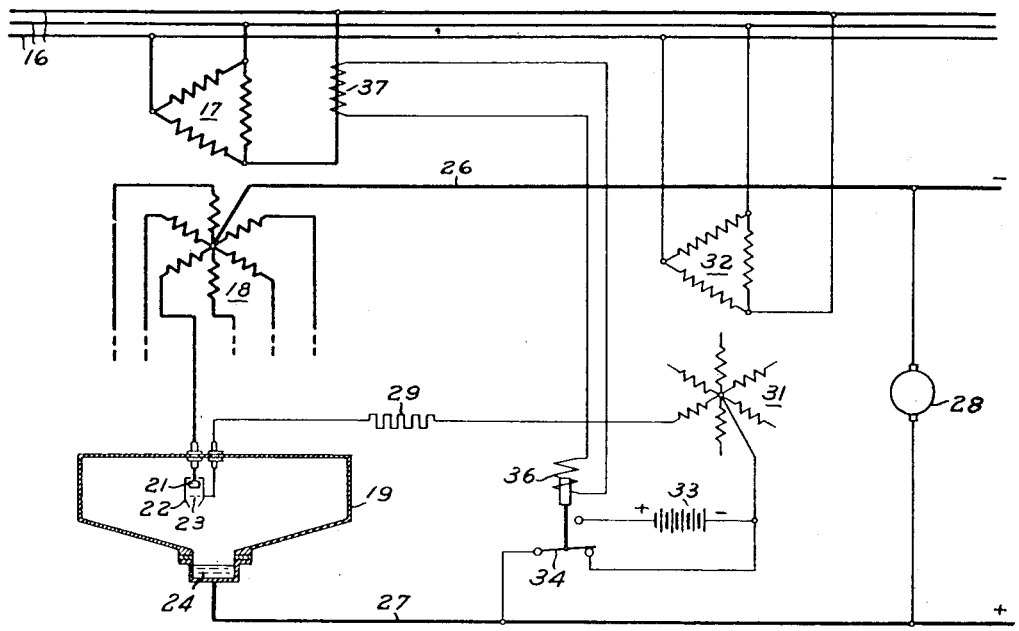
Figure 2:
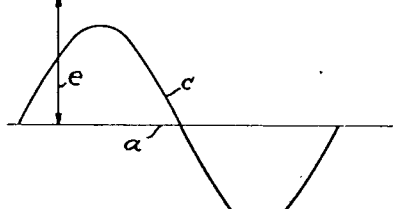

Figure 2 illustrates the potential relation of the control electrodes during the operation of the system illustrated in Figure 1. Line $a$ designates the cathode potential when the arc is picked up by an anode and line $b$ indicates the potential of the cathode when the battery 33 is connected therewith. The line $e$ represents the potential of the battery 33 and the curve $c$ represents the potential applied to the control electrodes 23 from the secondary winding 31 of the control electrode supply transformer.

Figure 3:
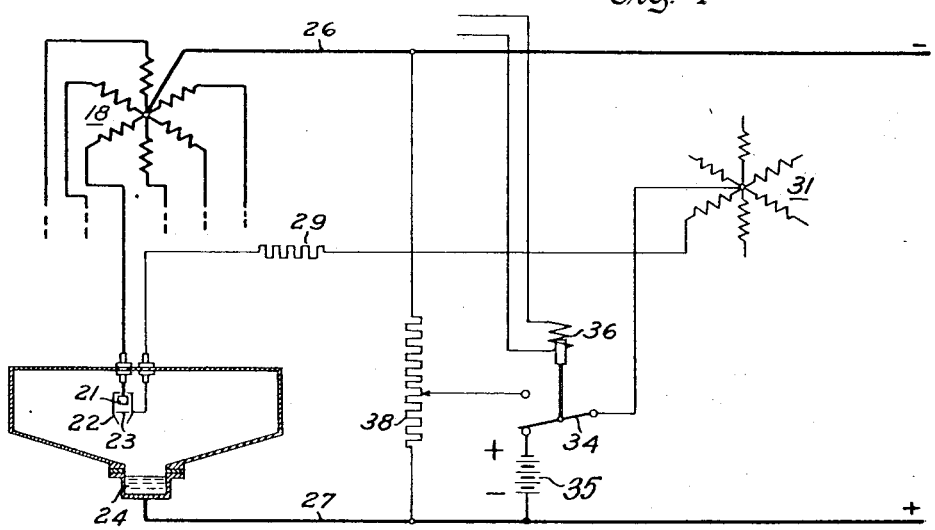

Figure 3 illustrates the use of a variable resistance 38 connected between the positive and the negative bus bars of the direct current output circuit of the rectifier for the purpose of providing the direct current potential to be impressed on the control electrodes as above described thus eliminating the necessity for the direct current source 33. A source of negative direct current potential 35 is, however, preferably connected between the cathode 24 and the neutral point of the transformer secondary winding 31 for the purpose of continuously superposing a direct current potential on the alternating current potential supplied to the control electrodes from the secondary winding 31 during normal operation. The movable contact on the resistance 38 is connected with the neutral point of the transformer secondary winding 31 of the control electrode supply transformer upon actuation of the armature of relay 36 with results similar to those obtained by connection of the battery 33 with the cathode and with the neutral point of the secondary winding 31 as shown in Figure 1.

When the phase positions of the potentials supplied from phase windings of the control electrode transformer secondary winding 31 is fixed relative to the phases of the potentials supplied to the main anodes 21, the moment at which the anodes may pick up the arc is determined by the magnitude of the positive potentials impressed on the control electrodes. If a source of direct current such as a battery is provided as shown at 39 in Figure 4, and the battery is connected between the cathode 24 and the neutral point of the transformer secondary winding 31, the neutral point may be displaced in either a negative or a positive direction relative to the cathode potential during normal operation of the rectifier by making the connections with the battery 39 variable as shown. The direct current potential superposed upon the alternating current potential supplied to the control electrode may thus be varied as desired.

Figure 5:
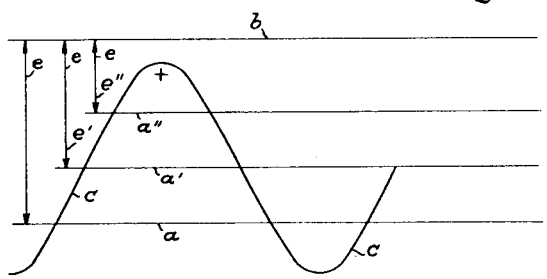
Fig. 5 is a graphic diagram illustrating the potential relations of the rectifying system shown in Fig. 4.

Figure 5 is a graphic diagram illustrating the potentials applied to the control electrodes relative to the cathode potential. The lines $a$, $a'$ and $a''$ designate the cathode potentials at different settings of the movable battery contact and the line $b$ represents the cathode potential when raised by the amounts $e$, $e'$ and $e''$, representing different settings of the movable battery contact 39''. The curve $c$ represents the potential applied to the control electrodes and the intersections of the lines $a$, $a'$ and $a''$ with the curve $c$ show the displacement of the point at which the anodes 21 may pick up the arc due to the different potentials applied to the control electrodes as a result of displacement of the neutral point of the control electrode supply transformer secondary winding 31.

Figure 4:
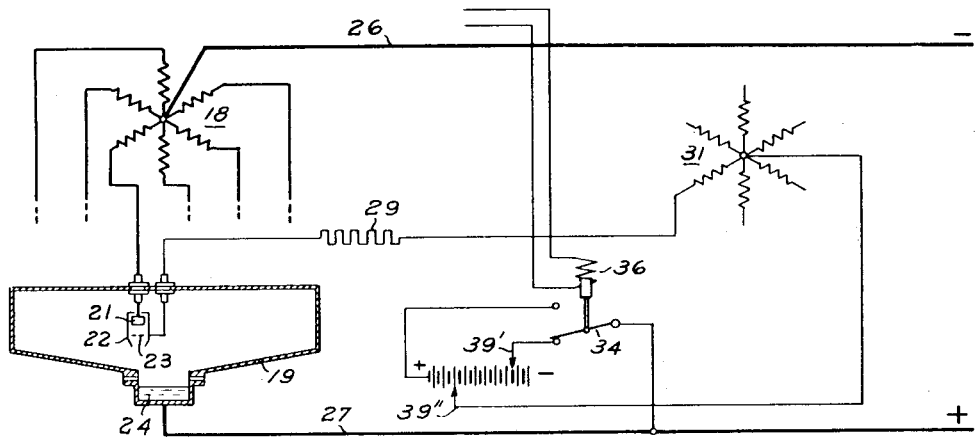
Fig. 4 illustrates a system for rectifying electric current employing an electric current rectifier of the metallic vapor arcing type having control electrodes on which a combined alternating current and direct current potential is impressed in such manner as to displace the moment at which the main anodes pick up the arc relative to the cycle of potential impressed upon such main anodes.
Figure 6:
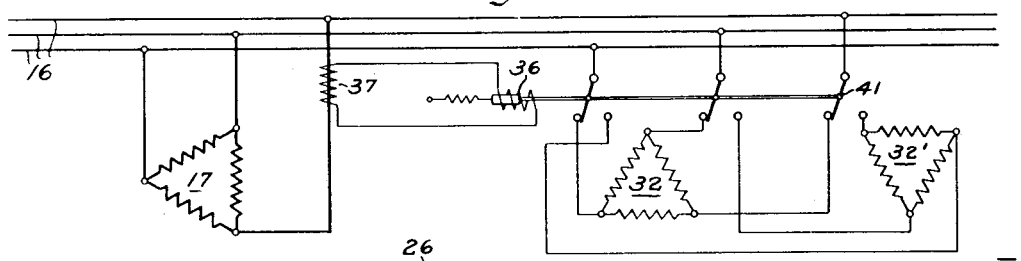
Fig. 6 illustrates an electric current rectifying system in which means are provided for displacing the phase of an alternating current potential impressed on the control electrodes of an electric current rectifier of the metallic vapor type upon the occurrence of a disturbance in the system.
Figure 6:
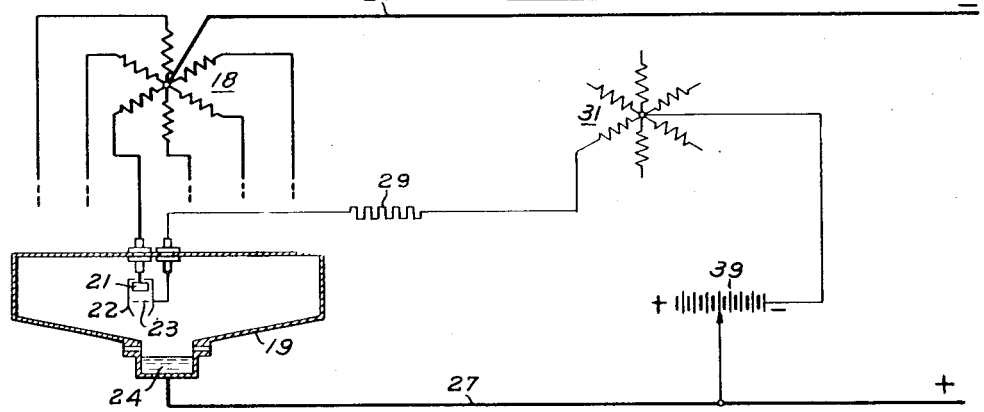

Backfires and short circuits may also be interrupted by connecting the control electrodes 23 with phase windings of the control electrode supply transformer which are displaced 180° relative to the phases of the associated anodes rather than by the impression of a negative bias on the control electrodes from a source of direct potential as shown in Figures 1, 3 and 4, above described, upon the occurrence of such backfire or short circuit. Such change in phase connections may be obtained by dividing the primary winding of the control electrode supply transformer into two portions 32 and 32' displaced in phase by 180° and by controlling the connection of the two portions with the alternating current line 16 by means of a switch 40 which is operated by a magnet 41 when actuated upon energization of the coil thereof from the current transformer 37. Only one of the control electrode transformer primary windings is under voltage at any time. When a backfire or short circuit occurs at any point in the system, the resulting overload on the primary winding 17 of the anode supply transformer causes actuation of the magnet 41 which changes the position of switch 40 from that shown in the drawing in which the primary winding 32 is connected with the supply line 16 to cause connection of the primary winding 32' with the line 16. The phases of the winding 32' are displaced by 180° from the phase position of the winding 32. The potential on the control electrodes is thus changed from positive to negative and the arc flowing from the cathode to the anodes or from one anode to another is prevented from reattaching on the anodes after interruption thereof. The battery 39 serves to displace the neutral point of the control electrode supply transformer secondary winding 31 which results in changing the point at which the anodes 21 are permitted to pick up the arc as above described.

Any other source of direct current potential may also be used to displace the neutral point of the control electrode transformer secondary winding 31 and thus to interrupt backfires or short circuits. The use of such other source is shown in Figure 7 which illustrates the use of a direct current generator 42 connected between the cathode 24 and the neutral point of the transformer secondary winding 31. The terminal voltages of the generator 42 must be lower than the phase voltages of the secondary winding 31 so that the potential impressed on the control electrodes 23 periodically rises above the potential of cathode 24 thus facilitating the pick up of the arc by the main anodes 21. Upon the occurrence of a backfire or a short circuit in the rectifying system, the magnet 41 is actuated from the current transformer 37 and the position of switch 43 is changed from the normal operating position in which the primary winding 32 of the control electrode supply transformer is connected with the supply line 16 to the position in which the primary winding is short circuited. The transformer 31, 32 then does not supply a potential to the control electrodes 23 and the control electrodes continuously have bias impressed thereon which is negative relative to the cathode potential thereby causing interruption of the backfire or short circuit arc. The direct current output potential of the rectifier may be changed by varying the terminal voltages of the generator 42.

Figure 8 is a diagram illustrating the control electrode potentials taken relative to the cathode potential in a system of the character illustrated in Figure 7. The cathode potential is represented by the line $a$ and $e$ indicates the terminal voltage of the generator 42. The curve $c$ represents the potential impressed upon the control electrodes from the transformer winding 31. Change of the potential $e$ will change the position of line $a$ and hence will change the position of the intersection thereof with the curve $c$ which indicates the point at which the arc will be picked up by an anode.

Figure 9 illustrates an embodiment of the invention in which the neutral point of the control electrode supply transformer secondary winding 31 is disconnected from the cathode 24 of the rectifier upon the occurrence of a backfire in the rectifier or a short circuit in the direct current system, by means of a switch 44. The direct current source 42 is connected with the control electrodes 23 through resistances 46. The positive terminal of the direct current source 42 is also connected, under such circumstances, with the cathode 24 upon operation of the switch 44, by the auxiliary contacts thereof, by magnet 41 against the action of a spring 47 upon the occurrence of a backfire or short circuit. The control electrode transformer secondary winding 31 is then disconnected from the control electrodes and the negative terminal of the direct current source 42 is connected with the control electrodes through the resistance 46 and 29. All of the control electrodes thus have a negative potential impressed thereon from the generator 42. The generator may also be used to control the ignition point of the anodes and hence to control the direct current potential output of the rectifier.

Figure 10 is a diagram which graphically illustrates the potential relations of the control electrodes relative to the cathode potential represented by the line $a$. $e$ designates the potential of the direct current source 42 and the curve $c$ represents the potential applied to the control electrodes by the winding 31.

A modified embodiment of the invention is shown in Figure 11 which differs from that shown in Figure 9 in that the several coils forming the control electrode transformer secondary winding are not disconnected at the neutral point but are short circuited through some of the resistance in the control electrode circuits. Upon the occurrence of a backfire or short circuit, the coil of relay 36 is operatively energized by the current transformer connected with the primary winding of the anode supply transformer and closes contacts 47 thus short circuiting the transformer secondary winding 31 through the resistances 46 and connecting the generator 42 with the control electrodes 23 which are negatively charged thereby.

Figure 12 illustrates an embodiment of the invention in which backfires or short circuits are interrupted by connection of the control electrodes with a potential displaced 180° relative to the potential applied to the anodes by changing the connections of the primary winding of the control electrode transformer. The primary winding of the control electrode transformer is divided into portions 32 and 32'. The portion 32' is displaced 180° relative to the phase position of the portion 32 and a switch 48, operated by magnet 41 is arranged to connect the one or the other of the portions of the primary winding with the line 16. Upon the occurrence of a backfire or short circuit, magnet 41 is energized from current transformer 37 to change the position of switch 48 thus connecting the winding portion displaced 180° relative to the portion previously connected to the line 16. Negative potential is thus impressed on the control electrodes which, together with the associated anodes, were previously charged with positive potential and the backfiring or short circuiting arc is interrupted. The direct current source 42 in the present embodiment causes displacement of the ignition point for the anodes thus permitting regulation of the direct current potential output of the rectifier as previously explained.

The potential relations of the control electrodes relative to the cathode potential obtained from the embodiment shown in Figure 12 are graphically illustrated in Figure 13 in which $a$ designates the cathode potential to which is added the potential $e$ from the generator 42 thus increasing the control electrode potential to the amount indicated by the line $b$. The curve $c$ represents the resultant control electrode potential when primary winding portion 32 is connected with the line 16 and the curve $c'$ represents the resultant control electrode potential when the primary winding portion 32' is connected with the line 16.

In all of the embodiments of the invention above described, only a single control electrode having a combined alternating current and direct current potential impressed thereon has been shown as associated with each anode. The embodiment of the invention shown in Figure 14 illustrates the use of separate control electrodes for receiving either the alternating or direct current potential impressed on the same control electrodes in the previously described embodiments of the invention. The control electrode 23a arranged more closely adjacent to the anode 21 is connected through a resistance 29b with the battery 33 upon energization of relay 36 due to an overload on the primary winding of the anode supply transformer and the control electrode 23b less closely associated with the anode 21 is connected through a resistance 29a with the secondary winding 31 of the transformer supplying alternating potential to the control electrodes. The control electrode 23a is normally uncharged and is negatively charged relative to the cathode potential from the battery 33 only upon the occurrence of a backfire or short circuit to provide a negative bias which will repel the electrons adjacent the cathode and thus cause interruption of the arc when the potential on the associated anodes passes through zero. The control electrode 23b is charged with positive potential during normal operation of the rectifier to facilitate picking up of the arc by the associated anode.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric current rectifying system comprising an alternating current supply line, an electric current rectifier of the arcing type having a plurality of anodes and a vaporizable cathode, a transformer supplying potential to the anodes from the line, and a direct current output circuit supplied by the rectifier; control electrodes associated with the anodes, means for impressing an alternating current potential on said control electrodes to facilitate picking up of the arc by the associated anodes, means for superposing a direct potential upon said control electrodes during normal operation of the rectifier to vary the moment at which the arc is picked up by the anodes, a variable resistance connected across the direct current output circuit, and means for connecting a point of said resistance at a potential negative relative to the cathode potential with the first said means upon the occurrence of abnormal conditions in the system.

2. In an electric current rectifying system comprising an alternating current supply line, an electric current rectifier of the arcing type having a plurality of anodes and a vaporizable cathode, a transformer supplying potential to the anodes from the line, and a direct current output circuit supplied by the rectifier; control electrodes associated with the anodes, a transformer connected with the line and with said control electrodes operable to impress an alternating current potential on the latter, the last said transformer having a direct current potential impressed thereon, the primary winding of the last said transformer being divided into several portions displaced in phase relative to each other, means for changing the connections of the winding portions with the line upon the occurrence of abnormal conditions within the system, and a source of direct current potential which is negative with respect to the cathode potential connected with the secondary winding of the last said transformer.

3. In an electric current rectifying system comprising an alternating current supply line, an electric current rectifier of the arcing type having a plurality of anodes and a vaporizable cathode, a transformer supplying potential to the anodes from the line, and a direct current output circuit supplied by the rectifier; control electrodes associated with the anodes, a transformer connected with the line and with said control electrodes to impress an alternating current potential thereon, the last said transformer having a direct current potential impressed thereon, one of the windings of the last said transformer being divided into several portions displaced electrically relative to each other, a switch for changing the connections of the said winding portions with the line, and a magnet operable upon the occurrence of abnormal conditions in the system to actuate said switch.

4. In an electric current rectifying system comprising an alternating current supply line, an electric current rectifier of the arcing type having a plurality of anodes and a vaporizable cathode, a transformer supplying potential to the anodes from the line, and a direct current output circuit supplied by the rectifier; control electrodes associated with the anodes, a transformer connected with the line and with said control electrodes to impress an alternating current potential on the latter, the last said transformer having a direct current potential impressed thereon, the primary winding of the last said transformer being divided into several portions displaced electrically relative to each other, a switch for changing the connections of said winding portions with the line, said switch being operable to short circuit one of said primary winding portions upon actuation thereof, and means operable upon the occurrence of abnormal conditions in the system to actuate said switch.

5. In an electric current rectifying system comprising an alternating current supply line, an electric current rectifier of the arcing type having a plurality of anodes and a vaporizable cathode, a transformer supplying potential to the anodes from the line, and a direct current output circuit supplied by the rectifier; control electrodes associated with the anodes, a transformer connected with the line and with said control electrodes operable to impress an alternating current potential on the latter, a source of direct current potential, the last said transformer having a neutral point and having a direct potential current impressed thereon by connection of said source with the neutral point thereof, and means for short circuiting the last said transformer thereby connecting only said source of direct current potential with said control electrodes upon the occurrence of abnormal conditions within the system.

STEFAN WIDMER.
HANS KELLER.
MAX HÜRLIMANN.